Jan. 15, 1963
L. B. NICHOLS
3,073,351
JACKETED STRIP-WOUND METAL HOSE
Original Filed Feb. 5, 1959
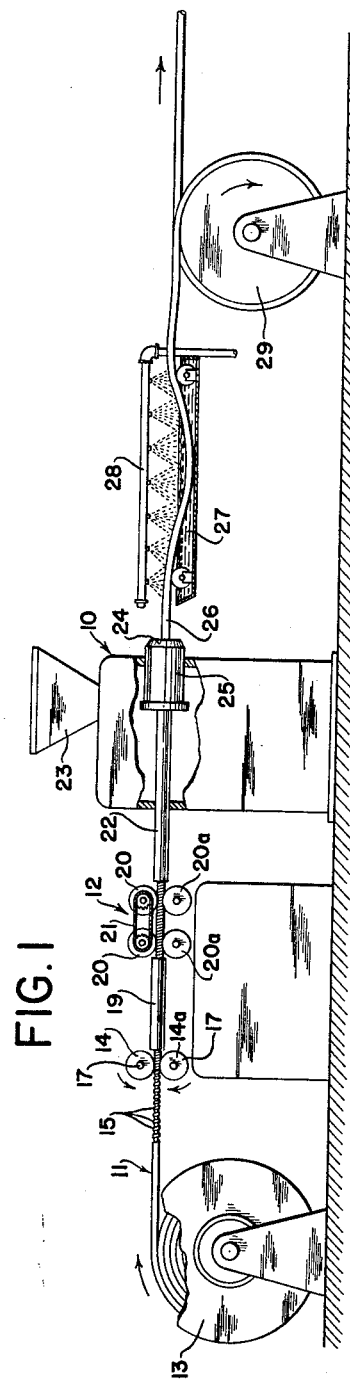
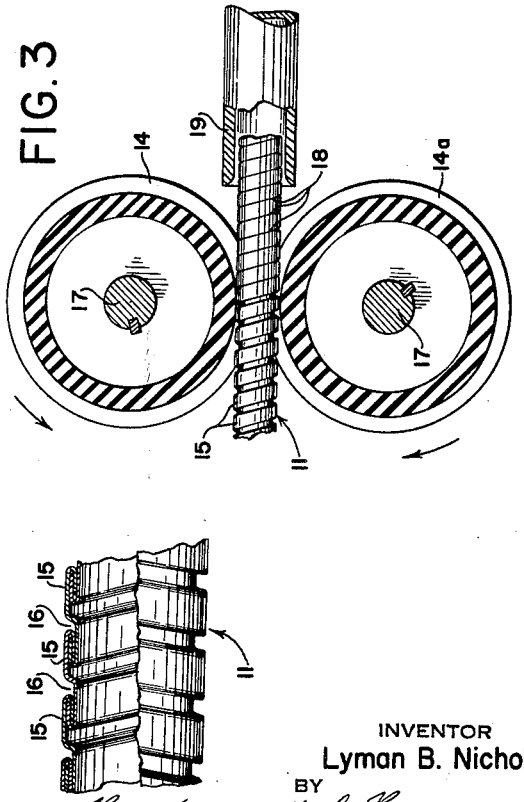
INVENTOR
Lyman B. Nichols
BY
*Pennie, Edmonds, Morton, Barrows & Taylor*
ATTORNEYS

United States Patent Office 3,073,351
Patented Jan. 15, 1963

3,073,351
JACKETED STRIP-WOUND METAL HOSE
Lyman B. Nichols, Watertown, Conn., assignor to Anaconda American Brass Company, a corporation of Connecticut
Original application Feb. 5, 1959, Ser. No. 792,251, now Patent No. 3,015,133, dated Jan. 2, 1962. Divided and this application Apr. 7, 1961, Ser. No. 101,497
2 Claims. (Cl. 138—131)

This invention relates to jacketed strip-wound metal hose and, more particularly, to a flexible metal hose of the strip-wound type having a jacket of plastic material which does not wrinkle appreciably when the hose is bent. This application is a division of my copending application Serial No. 792,251, filed February 5, 1959 which issued on January 2, 1962, as Patent Number 3,015,133.

In accordance with the invention, a thermoplastic or equivalent jacketing material is extruded about the strip-wound hose while its convolutions are maintained fully closed by the application of a pushing force which advances it through the extrusion operation. Jacketed hose produced thereby is characterized by having a snugly fitting jacket which, however, is free from any noticeable hoop stress when the hose is not under the influence of a tensile force, and which is further characterized by complete freedom of interpenetration of the jacket material into the spaces between adjacent convolutions of the hose. Owing to the manner in which the new jacketed hose is made, bending of a straight length of the hose is accompanied by movement of adjacent convolutions only in a direction away from each other on the outside of the bend. There can be no movement of the convolutions toward each other on the inside of the bend, and consequently wrinkling of the jacket on the inside of the bend does not occur.

Flexible metal hose of the strip-wound type is made by winding a metal strip about a mandrel and folding the strip longitudinally so that the edge portions of each convolution of the strip overlap and form a locked seam with the preceding and succeeding convolutions. The flexibility of metal hose made in this fashion results from a limited freedom of each hose convolution to be displaced axially through the interlock with respect to adjacent convolutions. When the hose is bent, the spaces between convolutions open slightly on the convex side of the bend, and close (or remain closed) on the concave side.

For many purposes it is desirable to apply a seamless jacket of flexible plastic material to the outer surface of strip-wound hose, to render it moisture tight, to protect the metal from abrasion, etc. The most convenient way of applying such jacket is to extrude it on a conventional plastic extruding machine. Conventional extrusion apparatus and procedures do not yield wholly satisfactory results, however, because the freshly extruded jacket material penetrates into the spaces between the convolutions of the hose as the latter is drawn through the extrusion apparatus. As a result, flexibility of the hose is impaired. Moreover, when the resulting hose is bent, the convolutions move toward each other on the concave side of the bend and cause unsightly and otherwise objectionable wrinkling of the jacket. When it is attempted to minimize penetration of the jacket material in the spaces between convolutions by extruding the jacket slightly oversize, the jacket is loose and wrinkling becomes even more unsightly and objectionable when the hose is bent.

Because of these and other difficulties incident to the application of plastic jackets by conventional extrusion operations to strip-wound interlocked metal hose, the art has sometimes adopted the cumbersome procedure of "blowing on" the jacket. This procedure involves extruding the jacket by itself, in the form of a tubing which in the unstressed condition has an inside diameter slightly less than the outside diameter of the metal hose. A length of such jacket tubing is then expanded by applying air pressure to its interior, and the metal hose is fed into the thus expanded plastic tube. Then, when the air pressure is released, the jacket tube contracts and hugs the metal hose tightly. Apart from the awkward and laborious character of this procedure, it suffers from the disadvantages that only limited lengths of hose can be jacketed by its use, and that the jacket (unless objectionably loose) is under substantial hoop stress.

The hose of the invention is made by applying a plastic jacket to a strip-wound interlocked (or square locked) metal hose by an extrusion operation. As indicated above, such hose is formed of interlocking helical convolutions in which each convolution is movable relative to adjoining convolutions axially of the hose through the interlock between a first position in which adjoining convolutions are in direct contact with one another, with the interstices between them fully closed, and a second position in which adjoining convolutions are spaced a substantial distance apart, with substantial interstices or valley spaces between them. The new hose is made by subjecting it to an axial force in a direction to maintain the convolutions in said first position while maintaining the axis of the hose substantially straight, and advancing the hose by the application of a pushing force thereto while maintaining its axis straight and with its convolutions in said first position. A jacket of plastic material which is elastic when set then is extruded about the hose as it is being thus advanced. The linear velocity at which the plastic jacket material is extruded is less than the linear velocity at which the metal hose is advanced by the pushing force, so as to cause the fresly-extruded plastic jacket to be stretched and necked down into close engagement with the outer surface of the hose without penetrating between the convolutions thereof. As a result of this method of applying the jacket, when the jacketed hose is bent adjacent convolutions can move only away from each other on the outside (convex side) of the bend and not toward each other on the inside (concave side) of the bend; and therefore wrinkling of the jacket due to movement of the convolutions toward each other on the inside of the bend is prevented.

Closure of the convolutions, preparatory to pushing the metal hose through the extrusion zone, is preferably effected by pushing the hose at a first linear velocity through the extrusion zone, and advancing the hose to the point of application of the pushing force at a second linear velocity which is substantially greater than said first linear velocity, the difference between these first and second linear velocities being great enough to bring each convolution of the hose into contact with adjoining convolutions, so that no further shortening of the hose can occur, and bending of the hose can occur only by movement of adjacent convolutions away from each other on the outside of the bend.

The extruded plastic material, which is advantageously thermoplastic in character, is caused to set as promptly as possible after the extrusion operation. For example, the hose with the freshly extruded jacket thereon is introduced immediately into a cooling vessel. Setting of the plastic should occur before the hose is subjected to any substantial tensile or bending force, thereby to avoid uncontrolled stretching of the plastic which would lead to ill-fitting sections of the jacket on the hose.

The jacketed hose produced by the method of the invention is characterized by having a jacket which fits snugly about the outer surface of the metal, but which is free from any noticeable hoop stress when the hose itself is free from the influence of any substantial tensile force. In this respect the new jacketed hose is distinctly superior to hose made by "blowing on" the jacket. The jacket of hose made in the latter fashion necessarily is under a substantial hoop stress on the hose, in order to make sure that it fits the hose snugly and does not wrinkle when the hose is bent. Because it is under a hoop stress, however, the edges of any cut which is made in it immediately pull apart, and there is always some tendency for a cut to run along the hose. Moreover, unlike hose having a jacket applied by a conventional extrusion operation, the new hose is characterized by there being no interpenetration of the plastic jacket material into the interstices between convolutions of the hose. Hence the jacket material of the new hose does not limit the extent to which adjacent convolutions may move relative to each other; and so limit the flexibility of the hose. Furthermore, the new hose in the unbent condition with its axis substantially straight has all its convolutions in the first position described above, that is, all convolutions are compressed as close together as possible, each convolution being in direct contact with adjoining convolutions completely about the circumference of the hose. Hence when the hose is bent, adjacent convolutions can move only away from each other on the outside of the bend, and wrinkling of the jacket due to movement of convolutions toward each other is prevented.

An advantageous embodiment of the invention is described below with reference to the accompanying drawings, in which:

FIG. 1 illustrates schematically an assembly of apparatus suitable for making the hose of the invention;

FIG. 2 is a detail, partly in cross section, of flexible metal hose with the convolutions thereof spaced apart, or opened, as they are likely to be upon being initially fed to the apparatus of FIG. 1;

FIG. 3 is a view, on an enlarged scale, of the portion of the apparatus shown in FIG. 1 which serves to close the convolutions of the hose;

FIG. 4 is a cross section through the extrusion head of the apparatus shown in FIG. 1; and FIG. 5 is a view, partly in cross section, of a section of the jacketed hose of the invention.

The apparatus shown in FIG. 1 comprises an extrusion apparatus 10 to which and through which metal hose 11 to be jacketed is fed by a pushing device 12. The metal hose is carried on a supply reel 13, from which it is drawn by a cooperating pair of convolution-closing rolls 14 and 14a.

The metal hose 11 is shown in the drawings as conventional strip-wound interlocked metal hose. However, it may equally well be strip-wound square locked metal hose (in which the side edges of each convolution are bent through only about 90° instead of 180°), or any other type of strip-wound flexible metal hose. The hose, as it is coiled on the supply reel 13, and particularly as it is drawn therefrom, is likely to be stretched out so that its convolutions 15 (FIG. 2) are opened, i.e. spaced apart so that the interstices 16 between them are as wide as the construction of the hose permits. The rolls 14 and 14a (which are shown on an enlarged scale in FIG. 3) rotate in the direction indicated by the arrows, and their supporting shafts 17 are geared or otherwise connected together so that they rotate at the same speed. They are preferably grooved peripherally on a radius of curvature equal to the radius of the metal hose, and the grooves advantageously are lined with rubber or other soft friction material. The rolls grip the hose gently but with sufficient force to draw it from the supply reel 13, and advance it toward the pushing device 12.

The rate at which the rolls 14 and 14a rotate is high enough so that they tend to advance the hose toward the pushing device 12 at a linear velocity considerably above that at which the pushing device itself advances the hose toward the extruder 10. As a result, the convolutions of the hose become fully closed, with the side edges of each convolution in direct contact with adjoining convolutions throughout the entire circumference of the hose, as indicated at 18 in FIG. 3. Advantageously, the rolls rotate a little more rapidly than the rate at which the hose is permitted to advance by the pushing apparatus 12, so as to insure that all convolutions of the hose will be tightly closed when the hose arrives at the pushing apparatus. As a result, the rolls 14 and 14a slip somewhat on the hose 11 as they advance it toward the pushing device. In order to prevent the hose from buckling, it is fed from the rolls 14 to the pushing device 12 through a rigid guiding tube 19.

The pushing device 12 consists essentially of two or more cooperating pairs of rolls 20 and 20a. These rolls may advantageously be of the same design as the rolls 14. Each cooperating pair of rolls 20 and 20a is geared or otherwise connected together to insure that they rotate at the same speed, and all pairs of rolls are similarly connected, and for the same purpose, as by a sprocket chain 21. The multiple pairs of rolls in the pushing device 12 grip the hose with considerably greater aggregate frictional force than does the single pair of convolution-closing rolls 14. Hence the latter do not serve to push the hose forward any more rapidly than the rolls of the pushing device 12 permit. These latter rolls are rotated at the velocity required to advance the hose, with its convolutions maintained fully closed, at the desired velocity through the extrusion apparatus 10. A rigid guiding tube 22 receives the hose as it leaves the pushing device 12, to prevent it from buckling and to insure that its axis is kept straight in its passage to and through the extruding apparatus.

The extruding apparatus 10 is itself of conventional construction. Thermoplastic or other plastic material to be extruded about the hose (such, for example, as vinyl chloride polymer, polyethylene, a rubber composition, or the like) is fed into the apparatus through a feed hopper 23. This material, heated sufficiently to be in a readily deformable plastic state, is forced under pressure out through a cylindrical extrusion die 24 in the extrusion head of the apparatus. The extrusion die is shown in section and on an enlarged scale in FIG. 4. The cylindrical aperture 24a of the extrusion die is slightly greater in inside diameter than the outside diameter of the metal hose 11. The linear velocity at which the plastic material is extruded through the annular die opening 24a is a little less than the linear velocity with which the tube 11, with its convolutions fully closed, is passed through an axial opening in the extrusion die. At a short distance out from the extrusion die, the extruded plastic jacket 26 is brought snugly into engagement with the outer surface of the metal hose. Hence as the hose advances through the extrusion die, the soft plastic material just emerging from the die opening (indicated at 26') is stretched out by the advancing hose and is thereby necked down into snug engagement with the hose. In this manner a jacket which fits the hose snugly, regardless of minor variations in hose diameter along its length, but without being under any noticeable hoop stress, is formed about the hose. At the same time the plastic material is kept from penetrating to even a slight extent into the interstices between adjacent convolutions of the hose. Moreover, with the hose straight, its convolutions are fully closed, and the only movement of the convolutions relative to one another which can occur is that of separations along the outside of the bend— no movement of convolutions toward each other on the inside of the bend can occur, and thereby wrinkling of the jacket when the hose is bent is prevented.

Promptly after formation of the extruded jacket 26, the hose is delivered into a cooling vessel 27 wherein it is cooled to room temperature, or into such other apparatus as is required to cure or set the plastic material. The cooling vessel shown in FIG. 1, which is well suited to congealing a freshly extruded thermoplastic, consists essentially of a long narrow trough filled with water in which the jacketed hose is immersed. Water sprays from a spray pipe 28 also may be directed on the hose passing through the cooling vessel. The hose is advanced through the cooling vessel by the pushing force applied to it by the pushing device 12, so that no substantial tensile force or bending is imposed upon it until the jacket material has been congealed or set. The slight degree of bending required for the hose to settle to the bottom of the cooling vessel 27 (which degree of bending is exaggerated in FIG. 1) is not great enough to have any deleterious effect on the jacket. Thereafter, the hose passes around a capstan 29 which is rotated at a velocity just sufficient to take it from the cooling vessel at the same rate that it is advanced therethrough by the pushing device 12. From the capstan, the jacketed hose is conveyed to apparatus (not shown) by which it is wound into coils or on to reels.

Jacketed hose prepared in the manner described above is illustrated, partially in cross section, in FIG. 5. In the completed hose, the frictional engagement of the jacket 26 with the hose holds the convolutions 15 closed, with their side edges in contact all around the circumference of the hose, in the same position in which they were advanced through the extruding apparatus, so long as the hose is straight. However, the ability of the hose to flex is not thereby impaired. Bending the hose simply causes the convolutions to open on the convex side of the bend, and to stretch the thermoplastic material correspondingly. There is and can be no movement of adjacent convolutions toward each other on the concave side of the bend, with attendant compression and wrinkling of the jacket material. Hence the hose when bent preserves the same smooth and unwrinkled appearance it has when straight. When the hose is straightened again, the adjacent convolutions are returned to the closed position shown in FIG. 5 and the stretched thermoplastic jacket contracts again. Thus the jacket remains free of objectionable wrinkles whether or not the hose is bent. It will be noted that the jacket 26 forms a smooth cylindrical outer layer which does not interpenetrate the hose convolutions and which thus does not present any obstacle to the movement of the convolutions toward and away from each other.

A feature of the hose produced as described above is that the jacket fits snugly about the outer surface of the metal hose throughout the enire length of the hose, regardless of minor commercial manufacuring variations in the hose diameter. At the same time, the jacket is free from any noticeable hoop stress throughout the entire length of the hose. The jacket therefore does not bunch or wrinkle; yet neither do the edges of any cut that may inadvertently be made in the jacket tend to pull apart and thus tend to make the cut run lengthwise of the hose. The hose thus retains a neat and attractive appearance under all conditions of use, and injury to the jacket does not tend to be self-propagated, or to enlarge in any way.

It is of course apparent that jacketed hose may be made in accordance with the invention in any length for which the metal hose itself is available. Such hose is well protected against leakage, in or out, of moisture or other liquids, for the jacket is itself a seamless liquid- and gas-tight tubing. At the same time, the hose has the mechanical ruggedness of the strip-wound metal hose itself, and it is as flexible as the metal hose used in its manufacture.

Jacketed strip-wound metal hose made as herein described may be used with great advantage as flexible electrical wiring conduit in regions where a moisture proof but flexible conduit is required. Many other uses will also suggest themselves to those skilled in the art.

I claim:

1. Jacketed strip-wound flexible metal hose having axially interlocking helical convolutions in which each convolution is movable relative to adjoining convolutions axially of the hose through the interlock between a first position in which adjoining convolutions are in direct contact with one another and a second position in which adjoining convolutions are spaced a substantial distance apart, and a seamless jacket of plastic material fitting snugly about the outer surface of said hose but free from any noticeable hoop stress when the hose is free from the influence of any substantial tensile force, said hose in the unbent condition with its axis substantially straight having the convolutions held in said first position by frctional engagement therewth of the jacket without any penetration of the jacket material between said convolutions, whereby when the jacketed hose is bent adjacent convolutions can move only away from each other on the outside of the bend and wrinkling of the jacket due to movement of convolutions toward each other on the inside of the bend is prevented.

2. Jacketed strip-wound flexible metal hose having axially interlocking helical convolutions in which each convolution is movable relative to adjoining convolutions axially of the hose through the interlock between a first position in which adjoining convolutions are in direct contact with one another and a second position in which adjoining convolutions are spaced a substantial distance apart, and a seamless jacket of plastic material fitting snugly about the outer surface of said hose but free from any noticeable hoop stress when the hose is free from the influence of any substantial tensile force, said hose in the unbent condition with its axis substantially straight having the convolutions held in said first position by frictional engagement therewith of the jacket, whereby when the jacketed hose is bent adjacent convolutions can move only away from each other on the outside of the bend and wrinkling of the jacket due to movement of convolutions toward each other on the inside of the bend is prevented.

References Cited in the file of this patent

UNITED STATES PATENTS

| | | |
|---|---|---|
| 1,811,816 | Blake | June 23, 1931 |
| 2,045,540 | Debenedetti | June 23, 1936 |

FOREIGN PATENTS

| | | |
|---|---|---|
| 502,593 | Belgium | May 15, 1951 |